Dec. 10, 1957  L. G. L. THOMAS ET AL  2,815,922
POWER-OPERATED MECHANISM
Filed Feb. 28, 1955  4 Sheets-Sheet 1
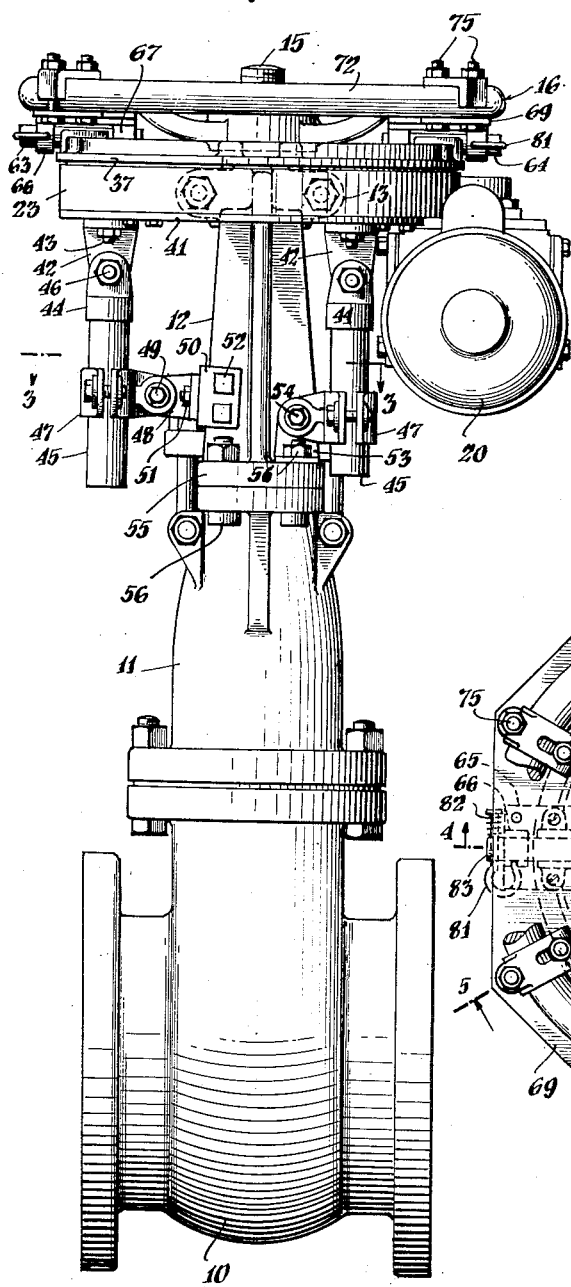
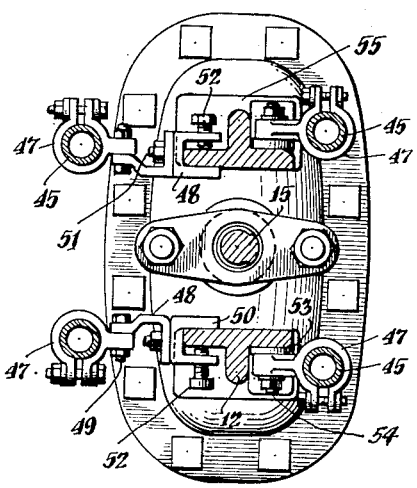
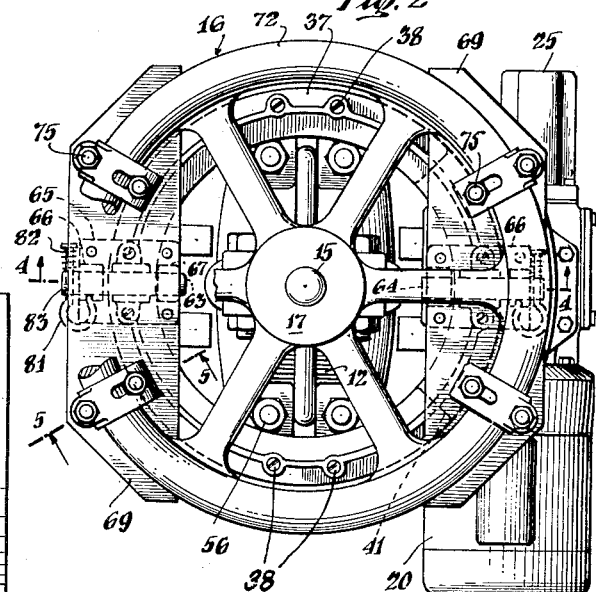
INVENTORS
Louis G. L. Thomas
Samuel K. Lehman
BY George F. Des Marais
ATTORNEY

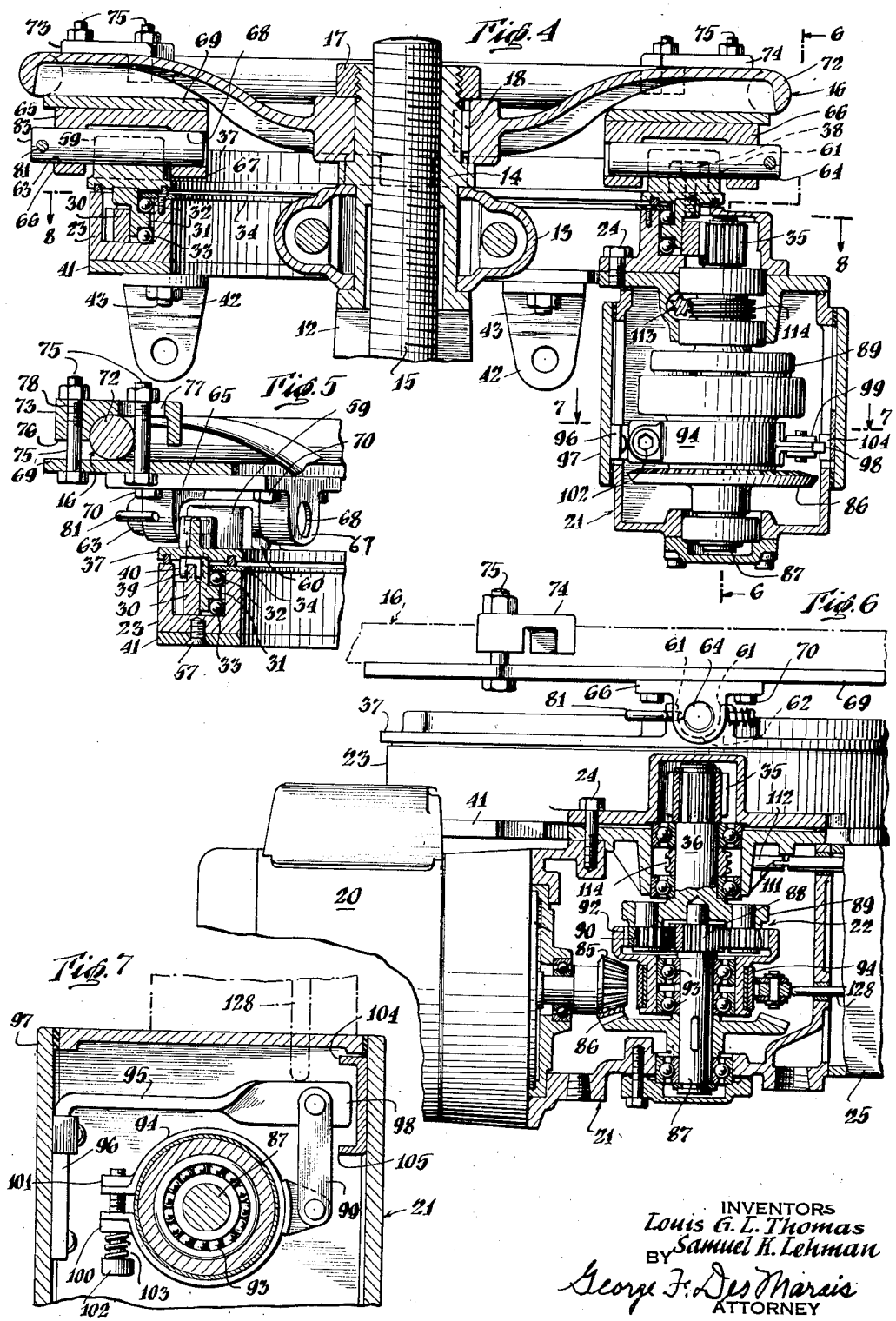

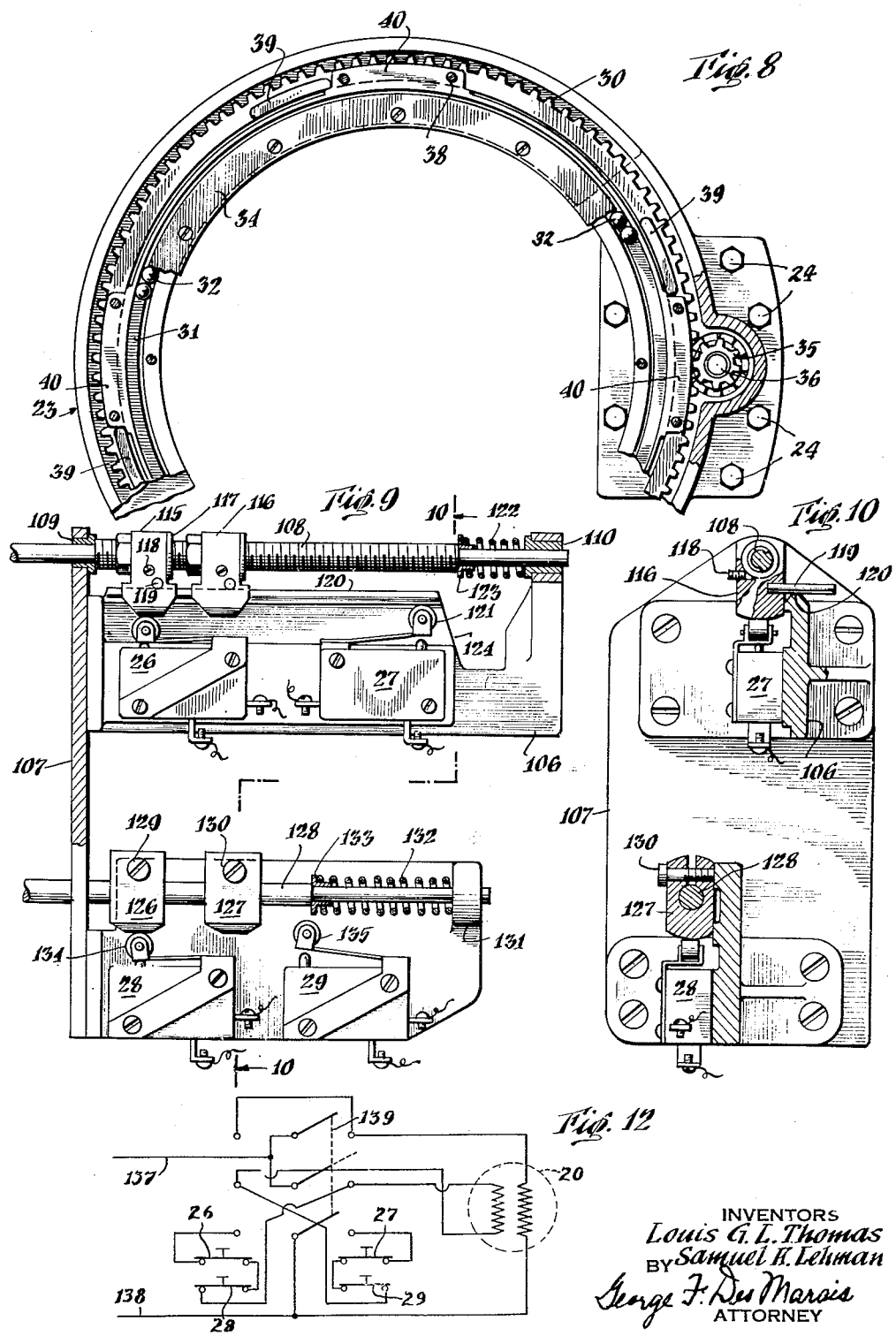

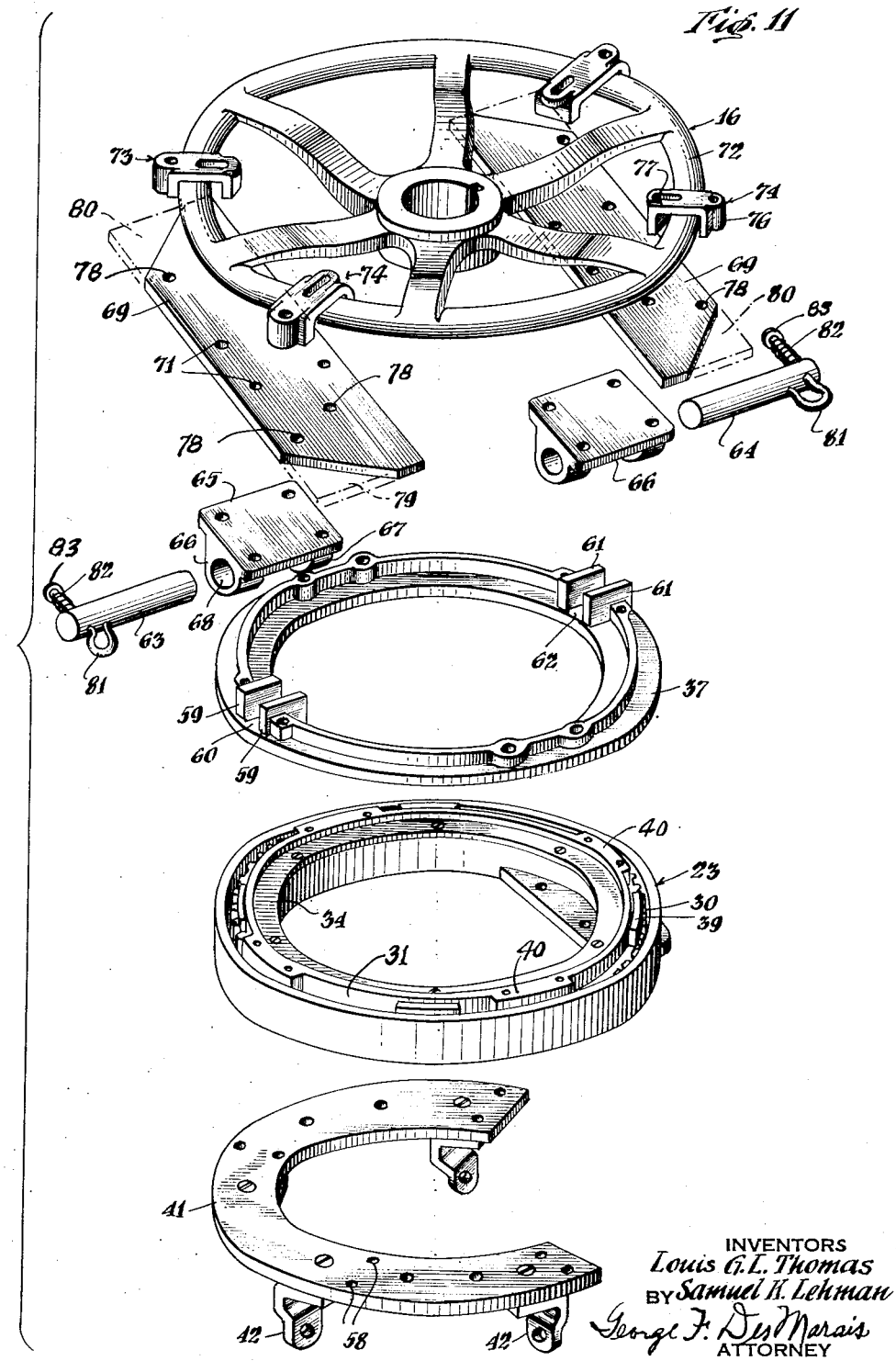

United States Patent Office 2,815,922
Patented Dec. 10, 1957

2,815,922

POWER-OPERATED MECHANISM

Louis G. L. Thomas, Merion Station, Pa., and Samuel K. Lehman, Brooklyn, N. Y., assignors to C. H. Wheeler Manufacturing Company, Philadelphia, Pa., a corporation of Pennsylvania Application February 28, 1955, Serial No. 490,843

11 Claims. (Cl. 251—76)

This invention relates to power-operated mechanisms for shafts by which devices are positioned and controlled, and more particularly to a supplementary mechanism for attachment to a valve to enable operation of the valve by a motor, as well as by hand.

There are many valves for use in pipe lines which require the services of attendants for operating them, and it frequently becomes desirable to supplant such valves with other valves which are capable of being operated by motors. To replace valves subject only to manual operation, or to convert them for operation by power is costly. In converting them for power operation it is a common practice to discard certain members of the original installation which are still useful, such as the valve yoke, the stem nut, and the handwheel, for example, and install a complete unit including a specially designed mounting and gearing. Owing to the many varieties of existing manually operable valves and their different sizes, it is necessary to carry in stock or make available a large number of power-operated units of different designs and this practice loads the changing-over expense unnecessarily. Moreover, the discarding of useful parts of an original valve is an unnecessary waste.

A motor-operated mechanism of the present invention of one size may be attached to any one of a number of varieties of manually operable valves having different configurations and used in conjunction with handwheels of different diameters as originally supplied with the valves, to the end of effecting economy in the expense attendant to converting valved pipe line systems to motor control. The invention makes it possible to retain all of the original parts of a valve with which it is to be used, and it is sufficiently compact to enable its mounting on the valve in the limited space available below a standard handwheel and therefore is peculiarly suitable for installation where space is at a premium, as on shipboard, for example, as well as for general use in industry. Another object is to provide a complete assembly of moving parts of a power-operating mechanism which is adapted for mounting as a unit in operable relationship with a controlled device without the need of special skill.

For use in conjunction with a valve, the power assembly is secured to a framework having provisions for its attachment to a valve. The framework supports the mechanism in the already available space around the valve stem and below the handwheel.

The operating mechanism includes a gear train and torque limiting device, means for operating the handwheel from the gear train, and auxiliary devices for automatically limiting the torque to be applied to the handwheel and for controlling the stopping of the motor for positioning the valve in open and shut positions. The means for transmitting rotary motion to the handwheel includes a gear ring, a drive ring and disconnectable members between the drive ring and the handwheel whereby the power connection to the handwheel may be discontinued at will to enable the handwheel to be operated by hand. The connections between the drive ring and the handwheel are of such a nature as to enable a power-operated mechanism of a particular size to be attached to and used with handwheels of various diameters. Other features and advantages will appear from the following description of a construction in which the principle of the invention is embodied.

In the accompanying drawing,

Fig. 1 is an elevational view illustrating the power-operated mechanism of the present invention mounted on a conventional valve;

Fig. 2 is a view of the assembly illustrated in Fig. 1 as seen from above;

Fig. 3 is a horizontal section on line 3—3 of Fig. 1;

Fig. 4 is an enlarged vertical section on line 4—4 of Fig. 2;

Fig. 5 is an enlarged section on line 5—5 of Fig. 2;

Fig. 6 is a vertical section on line 6—6 of Fig. 4;

Fig. 7 is a horizontal section on line 7—7 of Fig. 4 and showing the mechanical device for controlling the torque;

Fig. 8 is a horizontal view on line 8—8 of Fig. 4 showing a base ring and associated drive ring and lost motion members with parts broken away;

Fig. 9 is a front elevational view of switches for controlling the motor circuits for stopping the movements the valve and for limiting the torque applied to the driven members;

Fig. 10 is a vertical section on line 10—10 of Fig. 9;

Fig. 11 illustrates in separated relationship the top plate of a mounting frame and a conventional handwheel, and members disposed therebetween whereby the handwheel is connected for rotation; and Fig. 12 is a circuit diagram.

While the mechanism of the present invention may be used to control the operation of a shaft, or of any device by which a controlled shaft is operated, its manner of operation can readily be understood from a description of its association with a valve. The valve illustrated in the drawing is intended to be representative of any type of valve howsoever the fluid passage or the fluid controlling means are constructed.

The valve shown in Figs. 1, 2 and 3 is known as an open stem and yoke valve wherein the valve stem is in threaded engagement with a nut which is rotated by a handwheel. The valve comprises a valve body 10, a bonnet 11, a yoke 12 supporting a yoke cap 13, a yoke stem nut 14 (Fig. 4), a valve stem 15 and a handwheel 16. The handwheel is fastened to the yoke nut 14 by a handwheel nut 17 and a key 18.

For completing the assembly of the power-operated mechanism on a valve it is necessary only temporarily to remove the handwheel and then replace it after the power-operated mechanism is properly positioned. While the illustrated valve is of the type in which the valve stem reciprocates upwardly and downwardly in opening and closing a gate or other passage closing and opening device, it is apparent that the present invention is applicable for use with a non-rising stem type of valve wherein the stem is rotated.

Any suitable type of a reversing motor 20 may be employed, Fig. 6. The motor is secured to a housing 21 for a gear train 22 which will be described more fully hereinafter, and the housing is in turn fastened to a base ring 23 by means of bolts 24 (Fig. 8). At the side of the gear train housing 21 opposite from the motor there is removably mounted a second housing 25 for containing switches 26, 27, 28 and 29 (Figs. 9 and 10) for automatically controlling the torque and the open and shut positions of the valve. These switches and their manner of operation will be described hereinbelow. It is a feature of the present invention that the torque to be transmitted through the power-operated mechanism can be mechanically controlled so that, if desired, the automatic electrical control of the operation of the valve may be dispensed with for any particular installation. Accordingly, the housing 25 and the contained switches may be omitted from the complete assembly if manual operation of a switch is to be relied on for stopping the motor.

The base ring 23 is in the form of a circular channel opening toward the handwheel and disposed, when mounted in place, concentric to the axis of the valve stem and in parallel relationship to the handwheel. As best seen in Figs. 4, 5, 8 and 11, the base ring 23 serves as an outer bearing member for a ring gear 30, a collar 31 and two sets of balls 32 and 33 located between the base ring and the collar. The balls serve as bearings for the collar. A cover 34 retains the balls and the collar within the race provided by the circular channel of the base ring.

The ring gear 30 is driven by a pinion 35, fast to the driven shaft 36 of the gear train 22. A drive ring 37 is fastened to the collar 31 by a plurality of screws 38 and is rotated thereby when the motor is in operation. A lost motion connection is provided between the ring gear 30 and the collar 31 to allow for a run of the motor preceding the opening and closing movements of the valve and to provide impacts on the collar 31 for initiating these movements. This lost motion mechanism includes an upstanding lug 39 on the ring gear 30 and an outwardly radially extending lug 40 on the collar 31. The lug 40 is disposed in the circular plane or path of movement of the lug 39 and is engaged thereby to rotate the collar as the ring gear is driven. While only one pair of cooperating lugs is essential, in the embodiment of the device illustrated there are four lugs 39 spaced 90° apart on the ring gear and four lugs 40 also spaced 90° apart on the collar. The amount of lost motion provided by these lugs is equivalent to the free travel of a lug 39 between two successive lugs 40.

The assembly comprising the base ring 23, ring gear 30, collar 31, drive ring 37, motor 20 and housing 23 constitutes a unit of associated members which needs no attention at the time it is mounted on a valve. This unit merely needs to be mounted in proper relationship to a valve and any suitable framework may be provided for that purpose.

The mounting frame for the base ring 23 includes a circular plate 41 which has a sector removed therefrom for affording clearance for the accommodation of the housing 25. This plate is supported on the valve by legs and clamps, or by any suitable means connecting with the valve to form a rigid framework to support the base ring 23. In the embodiment of the mounting frame shown in the drawing there are four of these legs. Referring to Figs. 1, 3 and 4, each leg includes an angle clip 42 having one leg secured to the plate 41 by a single bolt 43 which permits swivelling of the angle clip 42 as an adjustable feature by which the disposition of the leg can be arranged to conform to the requirements of a valve of a particular size or style. A socket member 44 for a pipe 45 is engaged to the depending leg of the clip 42 by a bolt 46. The pipe 45 has fastened to it a clamp 47 which is secured to another angle clip 48 by a bolt 49, and one leg of the clip 48 is fastened to a clamp 50 by a bolt 51. The clamp 50 is provided with a pair of set screws 52 which are tightened in engagement with a flange of the yoke of the valve. The bolts 43, 46, 49 and 51 are tightened when the desired height of the plate 41 and the angular setting of a leg is determined.

The two legs to the left of the yoke, as seen in Figs. 1 and 3, each have a clamp 50 for engaging different flanges of the yoke. The two legs more proximate to the motor and gear housing are similarly constructed except that the angle clips 53 at the lower ends of the legs are turned about the bolts 54 to present horizontally disposed flanges for contacting the flange 55 of the yoke to which they are anchored by yoke bolts 56. This latter arrangement is desirable for use in connection with the valve illustrated in order to provide sufficient spacing between the legs to accommodate the housing 21 of the gear train. For making an installation with a valve of other dimensions or configuration, the modes of attachment may be altered to suit the conditions prevailing.

The fittings described enable proper adjustment of the power-operated mechanism with respect to the handwheel in view of the universal adjustability provided by the various angle clips, clamps and bolts. When all of the bolts and screws are tightened the frame is rigid with the valve.

After the frame has been assembled and fastened to the valve, the handwheel is temporarily removed and the unit comprising the base ring 23 and associated members is placed upon the circular plate 41 and fastened thereto by a plurality of screws 57 (Fig. 5) extending upwardly through holes 58 (Fig. 11) which have previously been provided in the plate.

The drive ring 37 has a pair of upstanding lugs 59 forming a recess 60 extending laterally across the top of the ring and another pair of similar lugs 61 located on the ring diametrically opposite to the lugs 59 and provide a similar recess 62 parallel to the recess 60. These lugs serve to transmit rotary movement to the handwheel through a pair of drive pins 63 and 64 which are removably supported in the brackets 65 and 66.

The brackets and associated pins are carried by the handwheel and it will suffice to describe the mounting for one of the brackets. The bracket 65, as best seen in Figs. 4, 5 and 11, has a pair of bosses 66 and 67 spaced apart sufficiently to straddle the lugs 59 so as to clear the lugs when the handwheel is operated by hand. Each boss has a drilled hole 68 for receiving the pin 63. The bracket 65 is secured to the underside of a clamp plate 69 with a number of bolts 70 for which the holes 71 have been provided in the plate. The plate 69 is then placed to the underside of the rim 72 of the handwheel and the handwheel clamps 73 and 74 are mounted on the rim and bolted to the clamp plate 69 with bolts 75. Each clamp has an outer flange 76 which engages the outer edge of the rim and a pair of the bolts 75 engaging the inner edge of the rim, as best seen in Fig. 5.

The handwheel is replaced on the valve with the center of each of the brackets 65 and 66 disposed in the plane of revolution described by the lugs 59 and 61, respectively.

Each clamp is radially slotted at 77 so that the clamps may be used with handwheels having rims of different circumferences. The bolt holes 78 for the bolts 75 can be located and drilled on the job to suit the dimensions of different handwheels. When the positions of the clamps with respect to the clamp plates have been determined the excess portions 79 and 80 are sheared from the main portion of the plate.

Each of the drive pins 63 and 64 carries a locking pin 81 slidably mounted in a hole extending diametrically through one end of the drive pin. The locking pin is crooked at one end to provide a stop against its removal from the drive pin. The terminal of the crook engages in a hole in the boss 66 (Fig. 2) when the drive pin is in operable position. The locking pin is held in this position by a spring 82 tensioned between the drive pin and a head 83 on the locking pin. Upon withdrawing the terminal end of the crook from its retaining hole, the drive pin can be withdrawn from engagement with the lugs on the drive ring to permit manual operation of the handwheel.

The gearing in the housing 21 comprises an epicyclic gear train 22 driven from the motor 20 through the bevelled gears 85 and 86, Fig. 6. The gear 86 is keyed to a shaft 87 to which a sun pinion 88 is secured. The pinion 88 drives a planet gear carrier or spider 89 through planet gears 90. The shaft 36 of the spider carries the pinion 35 which is engaged with the ring gear 30.

The ring gear 92 of the epicyclic train is rotatable on bearings 93 which surround the shaft of the sun pinion 88, and is yieldingly held within a limited range of rotation by a friction band 94 (as best seen in Fig. 7) and a cantilever spring 95 which has one end 96 anchored to cover 97 and its other end 98 connected to the band by a link 99 and a bracket fast to the band. The band 94 has separated ends, each carrying a lug 100 and 101 affixed thereto. A screw 102 is in threaded engagement with the lug 101 and is adjustable for determining the amount of pressure exerted by the spring 103 on the lug 100 and hence the pressure of the band 94 on the hub of the ring gear 92. When the band grips the hub sufficiently tight to rotate in unison therewith the cantilever spring 95 flexes proportionately with the applied torque. A sufficient range of movement of the torque spring 95 is provided to absorb shock and protect the gearing. The stops 104 and 105 are to limit the travel of the free end of the torque spring in opposite directions from its normal position of rest.

The adjustability of the tension of the spring 103 affords a manner of mechanically controlling the maximum torque deliverable through the gear train. The band 94 can be locked to the hub of the ring gear 92 to turn as one with the gear, but by adjusting the screw 102 the gripping of the band on the hub may be changed to any degree desired to permit slippage between the band and the hub under a predetermined torque and so avoid undue strain or breakage of the valve or valve-operating members. With this arrangement the operation of the motor could be controlled by a conventional manually-operable start-and-stop switch.

In Figs. 9 and 10 there are illustrated devices for automatically controlling the operation of a motor.

The switches 26 and 27 determine the limit of movement of the valve or other controlled device in opposite directions, and the switches 28 and 29 determine the maximum torque that is effective in either direction of movement.

The switches 26 and 27 are mounted on a bracket 106 which is secured to a base plate 107 contained in the housing 25. The screw 108 is mounted for rotation and translation in journals 109 and 110 on the base plate and bracket, respectively. The shaft of the screw 108 has an overlapping connection 111, Fig. 6, with a shaft 112 which carries a worm wheel 113, Fig. 4, engaged by a worm 114 fast to the shaft 36 so that the screw 108 is rotated proportionately with the movement of a controlled device or valve.

Cams 115 and 116 control the switches 26 and 27, respectively, whereby the closed and open positions of a valve are determined. The cam 115 is mounted on an internally threaded sleeve 117 to which it is seized by a set screw 118. The cam is prevented from rotating by a pin 119 which slides along a horizontal shelf 120 as the screw rotates in one direction and by the bracket 106 as the screw rotates in the opposite direction. The cam 116 is similarly engaged to travel along the screw 118 as the screw rotates.

In Fig. 9, the cam 115 is in a position on the screw 108 corresponding to the closed position of a valve and the cam 116 is disposed on the screw and relatively to the cam 115 in such a position as to shut the motor down when the cam 116 has advanced with the rotation of the screw to a position for operating the actuator 121 of the switch 27.

If for any reason the motor is not shut down, either during a closing or opening movement, one or the other of the cams 115 and 116 causes the screw 108 to be shifted axially to the right to disconnect the overlapping connection 111 between the screw 108 with the shaft 112. The cam 115 accomplishes this during a closing movement when the cam has travelled to the left (Fig. 9) sufficiently to contact the journal 109. Continued rotation of the screw causes the stopped cam to shift the rotating screw 108 to the right against the action of a spring 122 and break the overlapping connection 111.

During an opening movement of a valve the screw 108 rotates in the opposite direction and if the motor does not stop, the cam 116 will engage the bushing 123 and shift the rotating screw 108 to the right (Fig. 9) until the overlapping connection 111 is disconnected. To prevent injury to the parts, the bracket 106 is cut away at the end of the shelf 120 to allow the cam 116 to rotate clockwise, as seen in Fig. 10. Should the rotation of the screw not be interrupted, the pin 119 on the cam 116 will fall away from the shelf 120 and cause the cam slope 124 to act on the pin to accelerate the translatory movement of the screw as the cam rotates with the screw, thereby to assure the uncoupling of the overlapping connection at 111. Should this occur, the cam will have to be manually reset with the pin 119 engaging shelf 120 for readying the mechanism for normal operation.

The switches 28 and 29 limit the torques that can be transmitted through the gear train for closing and opening a valve. The switches 28 and 29 are actuated, respectively, by a cam 126 and a cam 127. These cams are secured to a rod 128 by screws 129, 130. The rod 128 is slidably mounted on the base plate 107 and a boss 131. One end of the rod is continually held against the end 98 of the torque spring 95 (Fig. 7) by a spring 132 tensioned between the boss 131 and a collar 133 fast on the rod. When the motor is operating, the cams are between and out of contact with the actuators 134 and 135 of the switches 28 and 29, respectively, until a predetermined torque is reached. When the torque spring 95 is flexed sufficiently in one direction the cam 126 comes into engagement with the actuator 134, and when it flexes sufficiently in the opposite direction the cam 127 comes into contact with the actuator 135. In either case the switch affected stops the operation of the motor.

Any conventional reversible motor may be used. Fig. 12 is a representative diagram for a starting circuit for a single phase, four-wire, split phase motor 20 embodying a conventional magnetic switch in the usual manner. The power lines 137 and 138 are connected to a three-pole, double-throw switch 139 and the motor is operated in opposite directions depending on the selected closed position of the switch. The motor will be stopped by the opening of either of the limit switches 26 and 28 when running in one direction, or by either of the limit switches 27 and 29 when running in the opposite direction. In controlling a valve the control for the torque switch 28 would be set to break a motor-operating circuit just prior to the breaking of the circuit by the positioning switch 26, so that the switch 26 would break the circuit should the switch 28 not do so because of any reason. The open position of a valve is determined by the setting of the control for the switch 27, but if for any reason the opening torque exceeds a predetermined maximum torque before the switch 27 breaks the motor-operating circuit the switch 29 is actuated to break the circuit.

The circuit shown is merely for illustrative purposes, it being known that the choice of circuit is dependent upon the type of motor used, and the kind and number of switches and auxiliary circuits desired for signalling and for affecting various results.

The operation of the apparatus will be apparent to those skilled in the art in view of the foregoing disclosure. The principle of operation, together with the mechanism which is now considered to represent the best embodiment thereof, has been described, but it is desired that it be understood the mechanism disclosed is only illustrative and that the invention can be carried out by other means. Also, while the mechanism is designed to use the various features and elements in the combinations and relations described, some of these may be altered and others omit-

What is claimed is:

1. In combination, a valve having a handwheel optionally operable by hand or by power for actuating a valve closure, power-operated means for actuating said valve closure through the intermediary of said handwheel, said means including a driving member for driving said handwheel, said driving member being separate from and spaced below said handwheel and rotatable independently of said handwheel, a framework attachable to said valve for supporting said power-operated means on said valve as a unitary assembly apart from the valve and handwheel, means for attaching said framework in fixed position on said valve with said driving member disposed so as to rotate on the axis of said handwheel, means for connecting said driving member to said handwheel, said connecting means including elements carried by said handwheel and by said driving member, respectively, said elements carried by said handwheel comprising devices removably clamped to the handle of said handwheel, and a manually displaceable member which is adapted for interconnection with said elements for transmitting rotary motion from said driving member to said handwheel and for removal from said interconnected relationship to enable said handwheel to be operated by hand and independently of said power-operated driving member.

2. In combination, a valve having a handwheel optionally rotatable by hand or by power for actuating a valve closure, power-operated means for actuating said valve closure through the intermediary of said handwheel, said means including a driving member for driving said handwheel, said driving member being separate from and spaced below said handwheel and rotatable independently of said handwheel, a framework attachable to said valve for supporting said power-operated means on said valve as a unitary assembly apart from the valve and handwheel, means for attaching said framework in fixed position on said valve with said driving member disposed so as to rotate on the axis of said handwheel, and means for connecting said driving member to said handwheel, said connecting means including an element extending from said driving member and a bracket removably attached to the handle of said handwheel, said bracket having at least one element extending downwardly and disposed to pass adjacent to but clear of said first element upon rotation of the handwheel with respect to said driving member, and means for connecting said elements for concomitant rotation of said driving member whereby to enable manipulation of said handwheel to open or shut said valve closure without rotation of said driving member and said handwheel to enable power operation of said handwheel by said power-operated driving member.

3. In mechanism for operating a handwheel, the combination comprising a ring gear, a drive ring for rotating said handwheel, a rotary collar secured to said drive ring, said ring gear and said collar having engageable means for transmitting rotary motion from said ring gear to said collar, means for supporting said ring gear, drive ring and collar in parallel relationship to said handwheel and concentrically to the axis of said handwheel, power-operated means for driving said ring gear, means for connecting said drive ring to said handwheel, said connecting means including at least one clamp fastened to said handwheel, lugs carried by said clamp, lugs carried by said drive ring, and a removable member providing a driving connection between said first-named and said last-named lugs whereby said handwheel may be power-driven from said drive ring or may be operated by hand independently of said drive ring upon removal of said member.

4. In mechanism for operating a handwheel, the combination comprising an outer bearing ring having a circular channel concentric with and opening toward said handwheel, means for supporting said bearing ring in parallel relationship to said handwheel and concentrically to the axis of said handwheel, a ring gear and a rotary collar disposed in said channel, said ring gear and said collar having lugs for transmitting rotary motion of said ring gear to said collar, means for transmitting rotary motion from said collar to said handwheel, said means including alignable members carried by said collar and said handwheel, respectively, said members being spaced radially from one another so as not to interfere with the rotation of said handwheel independently of said collar, means for engaging said members to effect operation of said handwheel upon actuation of said collar, and motor-operated means for driving said ring gear.

5. In mechanism for operating a handwheel, the combination comprising motor-driven means including a hubless ring gear consisting of a rim with gear teeth on its periphery, a rotary collar, said ring gear and said collar having engageable members for transmitting rotary motion of said ring gear to said collar, means for supporting said ring gear and said rotary collar in concentric relationship, said supporting means including a circular raceway containing said ring gear and collar axially immovable with respect to each other, a gear train including a gear for driving said ring gear, a motor for driving said gear train, means carried by said supporting means for supporting said gear train and motor, and means engageable with said collar and said handwheel for transmitting rotary motion of said collar to said handwheel.

6. A motor-operated mechanism for operating a handwheel of a hubless valve, said mechanism comprising a ring gear consisting of a rim with gear teeth on its periphery, a rotary collar axially immovable with respect to said ring gear and having a lost motion connection with said ring gear for rotating said collar, an annular member for retaining said ring gear and rotary collar in nested relationship, a motor, a gear train intermediate said motor and said ring gear, means supporting said motor and gear train on said annular member, means for fixedly attaching said annular member to said valve with said annular member, ring gear and rotary collar disposed concentrically to said handwheel and below said handwheel, and means drivingly connecting said rotary collar to said handwheel whereby said handwheel is operated upon actuation of said rotary collar.

7. A motor-powered mechanism for attachment to a valve having a handwheel for operating a valve stem to actuate a valve closure comprising, in combination, a hubless ring gear consisting of a rim with gear teeth on its periphery, a drive ring for rotating said handwheel, a rotary collar for actuating said drive ring, said ring gear and said collar having engageable means for transmitting rotary motion from said ring gear to said collar, a bearing ring having a circular channel containing said ring gear and said rotary collar, a motor for driving said ring gear, a gear train intermediate said motor and said ring gear, a housing for said gear train, means for securing said housing to said bearing ring, means for drivingly connecting said drive ring to said handwheel, said last-named means being disconnectable at will to permit the operation of the handwheel independently of said motor and said gear train.

8. In combination, a valve having a handwheel for operating a stem to actuate a valve closure, means for driving said handwheel, a frame including a base ring for supporting said handwheel driving means, means for securing said frame to said valve, means for connecting said handwheel driving means to said handwheel, a housing attached to said base ring, a motor, a gear train for driving said handwheel driving means, said gear train being contained in said housing and including a sun pinion driven by said motor, a rotary member carrying a ring gear and a second rotary member carrying planet gears engaging said sun pinion and said ring gear, means for effecting restraint on the rotation of one of said rotary members, said means including a cantilever spring supported by said housing and having its movable end attached to a band which frictionally engages said one of said members, said cantilever spring yieldingly permitting limited rotation of said band and said one of said rotatable members about their center, and means for adjusting the friction of said band to allow slippage between said band and said one of said members thereby to limit the torque deliverable from said gear train.

9. A motor-powered mechanism for use with a valve having a handwheel for operating a stem to actuate a valve closure, said mechanism including a motor, means for operating said handwheel by said motor, said means including an epicyclic gear train comprising a driving pinion, a rotary member carrying a ring gear, a second rotary member carrying planet gears meshing with said pinion and said ring gear, a circuit for said motor, a switch for controlling said circuit to stop said motor, means yieldingly restraining the rotational movement of one of said rotary members, said means including a brake band seized upon and rotatable with said one of said rotary members, a cantilever spring having its movable end connected to said brake band whereby said spring flexes as said brake band turns, and means actuated by the movable end of said spring for operating said switch to open said circuit when said spring has been flexed by the rotary movement of said brake band through a predetermined angle of rotation.

10. In combination a valve having a handwheel optionally rotatable by hand or by power for actuating a valve closure, a valve stem, power-operated means including an annular member for driving said handwheel to actuate said valve stem, said driving member being displaced from said handwheel in a plane parallel to said handwheel and having an enlarged opening at its center defining a free space radially inwardly of the inner periphery of said driving member, a framework mountable on said valve for supporting said power-operated means clear of said valve, said framework including a base rotatably supporting said driving member with its axis of rotation coincident with the axis of said handwheel and having legs attached thereto and means for attaching said legs to said valve, said framework and said power-operating means constituting an assembly mountable in place as a unit on said valve, and means for transmitting torque from said driving member to said handwheel to rotate said handwheel, said last-named means including an element engageable with said handwheel and said driving member to effect a driving relationship between said power-operated means and said handwheel and disengageable at will to enable said handwheel to be operated by hand to actuate said valve stem independently of said power-operated means.

11. In mechanism for operating a handwheel, the combination comprising a ring gear, a drive ring directly connectable with said handwheel for driving said handwheel, a rotary collar secured to said drive ring, said ring gear and said collar having projections extending axially of said ring gear and collar, respectively, and engageable for transmitting rotary motion from said ring gear to said collar, means for supporting said ring gear, drive ring and collar in parallel relationship to said handwheel and concentrically to the axis of said handwheel, a motor, gearing between said motor and said ring gear for driving said ring gear, means supporting said motor and gearing on said first-named supporting means, and means directly engageable with said drive ring and said handwheel for driving said handwheel from said drive ring, said engageable means being disengageable to permit said handwheel to be actuated by hand.

References Cited in the file of this patent

UNITED STATES PATENTS

| | | |
|---|---|---|
| 777,372 | Howard | Dec. 13, 1904 |
| 801,012 | Howard | Oct. 3, 1905 |
| 916,831 | Bettinger | Mar. 30, 1909 |
| 1,218,236 | Backscheider | Mar. 6, 1917 |
| 1,587,869 | Smith | June 8, 1926 |
| 1,908,763 | Kelty | May 16, 1933 |
| 1,943,854 | Beckwith | Jan. 16, 1934 |
| 2,005,891 | Elberty | June 25, 1935 |
| 2,086,030 | Hodgson | July 6, 1937 |
| 2,145,616 | Waterworth | Jan. 31, 1939 |
| 2,176,572 | Hedgpeth | Oct. 17, 1939 |
| 2,278,216 | Rich | Mar. 31, 1942 |
| 2,352,140 | Trott | June 20, 1944 |
| 2,353,465 | Heath | July 11, 1944 |
| 2,409,132 | Lear | Oct. 8, 1946 |
| 2,566,945 | Laze | Sept. 4, 1951 |
| 2,623,618 | Howard | Dec. 30, 1952 |
| 2,709,062 | Lamb | May 24, 1955 |